United States Patent [19]

Dunn

[11] Patent Number: 4,491,951
[45] Date of Patent: Jan. 1, 1985

[54] ELECTRIC GLASS MELTING FURNACE

[75] Inventor: Charles S. Dunn, Pataskala, Ohio

[73] Assignee: Owens-Corning Fiberglas Corporation, Toledo, Ohio

[21] Appl. No.: 512,854

[22] Filed: Jul. 11, 1983

[51] Int. Cl.³ .................................................. C03B 5/027
[52] U.S. Cl. .......................................... 373/30; 373/76
[58] Field of Search .................... 373/27, 29, 30, 41, 373/76; 65/347, 355

[56] References Cited

U.S. PATENT DOCUMENTS

| | | | |
|---|---|---|---|
| 3,806,621 | 4/1974 | Machlin | 373/41 |
| 4,107,450 | 8/1978 | Costin | 373/30 |
| 4,366,571 | 12/1982 | Palmquist | 373/30 |
| 4,375,449 | 3/1983 | Siddall | 373/76 X |

Primary Examiner—J. V. Truhe
Assistant Examiner—R. Carr
Attorney, Agent, or Firm—Ronald C. Hudgens; Patrick P. Pacella

[57] ABSTRACT

A glass heating method and apparatus, such as a glass melting furnace or a forehearth, utilizing a refractory lining and electrically energized heating electrodes. The refractory lining is an erosion resistant material, preferably a chromic oxide refractory, having an electrical resistivity which is less than the resistivity of the molten glass, preferably an E glass, which is being heated. To avoid short-circuiting through the low resistance refractory, the refractory interposed between electrodes of opposite polarity is cooled to a temperature less than the temperature of the molten glass and at which the resistivity of the refractory is materially increased. Where the electrodes of opposite polarity are carried by opposing side walls, the end and/or side walls of the apparatus are cooled. Where the electrodes are all carried by a single wall, that wall is cooled.

15 Claims, 8 Drawing Figures

ELECTRIC GLASS MELTING FURNACE

BACKGROUND OF THE INVENTION

In the electric heating of molten glass, it is conventional to confine the glass in a heating receptacle, such as a melting furnace or a forehearth, which is lined with a refractory. The heating electrodes project through the refractory walls, usually either the side walls or the bottom wall, into the pool of molten glass in contact with the refractory lining. The electrodes, of course, are of opposite polarity, and the glass is heated between the electrodes by the current flowing between the electrodes.

Many different electrode arrangements have been proposed in the prior art to vary the electrode heating effects within the molten glass pool. One such arrangement utilizes electrodes carried by the opposing side walls of a melter or forehearth, the electrodes of each side wall being of the same polarity and the electrodes of the opposing walls being of opposite polarity. The resultant thermal current is used to heat the entire molten glass pool. Such an arrangement is disclosed in the pending U.S. application of Dunn et al, Ser. No. 405,851, filed Aug. 6, 1982.

Another arrangement of heating electrodes involves the insertion of heating electrodes of different polarity through a single refractory lined wall, usually a bottom wall, for example, as shown in U.S. Pat. Nos. 3,757,020 and 3,392,237.

The refractory lining of such furnaces necessarily is electrically conductive to a greater or lesser degree, and the conventional electric furnace requires the utilization of a refractory which is less conductive than the molten glass. Expressed in terms of electrical resistivity, the effective electrical resistivity of the refractory must be sufficient relative to the resistivity of the molten glass at the operating temperature of the glass heating apparatus to avoid any appreciable short-circuiting of the heating current through the refractory rather than through the molten glass. For this reason, zircon-type refractories of high resistivity have been utilized in electrical glass heating apparatus.

However, such zircon-type refractories are incompatible with certain glasses, such as C glass compositions, and are prone to erosion from such molten glass compositions flowing through the heating apparatus. Any electric glass heating apparatus utilizing such refractories with incompatible glass compositions has a notoriously short life. As a result, conventional electric glass heating apparatus has been limited to compatible, usually easily melted glasses, e.g., those glasses containing appreciable amounts of sodium oxide or the like, or to low throughout applications or to booster applications as a supplement to primary combustion heating.

The utilization of refractories of higher erosion resistance, such as chromic oxide refractories, has not been practical because such refractories have an electrical resistivity that is appreciably less than the resistivity of the molten glass at the furnace operating temperatures. As a result, such refractories short-circuit, and the electric current flow through the refractory heats the refractory, so that the heating apparatus lining wears excessively and sloughs off into the molten glass causing stoning in the glass. Eventually the refractory melts from the heating current flowing through the refractory.

Thus, the use of a chromic oxide refractory has not been practical although it has a service life which may be 7–10 times as great as the conventional zircon refractory when in contact with molten E glass, for example.

BRIEF DESCRIPTION OF THE INVENTION

The present invention now proposes a method and apparatus for electrically heating glass utilizing refractories which have high erosion resistance and low electrical resistivity by cooling the refractory to a temperature at which the resistivity of the refractory is increased and the tendency of short-circuiting through the refractory is appreciably reduced.

The heating apparatus may be a melting furnace having a pool of molten glass surmounted by a layer of unmelted batch, the pool being confined by electrode-bearing side walls joined by end walls and a bottom wall with the electrodes of opposing side walls being of opposing polarity. The side, end and bottom walls are all lined with an erosion-resistant refractory, e.g., a chromic oxide refractory, the electrical resistance of which varies inversely with the operating temperature and which has an electrical resistivity, at the temperature of the molten glass, which is less than the resistivity of the molten glass.

The heating apparatus, alternatively, may be a forehearth for conveying molten glass from a melting furnace to a forming apparatus. Here, the forehearth has side walls through which the electrodes extend into the molten glass stream to compensate for heat losses from the molten glass stream. Preferably, the side and bottom walls of the forehearth are lined with a similar erosion-resistant, low resistivity refractory.

As a third alternative, the heating apparatus may be a melting furnace in which all of the electrodes project through a single wall, e.g., the bottom wall. Such bottom-entering electrodes of different polarity are energized electrically to heat the glass above the bottom wall, and the bottom wall as well as the side walls are lined with erosion-resistant, low resistivity refractory.

The present invention proposes the cooling of that low resistivity refractory of the heating apparatus which is effectively interposed between electrodes of differing polarity to increase the electrical resistivity of the refractory and to reduce the tendency of the refractory to short-circuit in operation.

In a melting furnace, as above described, where the electrodes are carried by the respective side walls, the refractory tends to short-circuit primarily through the end walls beneath the upper level of the molten glass. By cooling the end walls, the resistivity of the refractory of the end walls is materially increased, and short-circuiting is reduced. Similarly, the bottom wall may be cooled to reduce the tendency for short-circuiting through the bottom wall.

In a bottom electrode melting furnace, the electrodes of the bottom wall are of different polarity, and cooling of the bottom wall will reduce the tendency toward short-circuiting through the bottom wall between electrodes of opposite polarity.

In a forehearth, cooling of the bottom wall increases the resistivity of the refractory of the bottom wall and reduces short-circuiting by current flow through the bottom wall.

By increasing the resistivity of the refractory, it becomes possible and practical to utilize chromic oxide refractories and similar refractories of enhanced erosion resistance, despite their inherent low electrical resistivity, so that the throughput of the heating apparatus can be increased, and the heating and melting efficiency of the apparatus is also increased. The amount of cooling of the side walls is sufficient to increase the electrical resistivity of the refractory to a value at which short-circuiting through the refractory is reduced, but not so great as to materially reduce the temperature of the molten glass being heated.

This is particularly applicable to glass melting furnaces of the type having side wall entering electrodes since the molten glass is heated primarily above the electrodes by electrode-generated currents. In such a furnace, the heated molten glass circulates primarily vertically upwardly from the central space between the electrodes against the overlying batch blanket and then downwardly along the furnace side walls. Cooling of the end walls and the bottom wall for the purposes of the present invention does not materially chill the molten glass because of its rapid, circulatory motion well above the bottom wall and along the non-chilled side walls.

Similarly, the cooling of the bottom wall of a forehearth or the bottom wall of a furnace having bottom entry electrodes does not materially decrease the temperature of the molten glass because the heated molten glass moves vertically upwardly from the electrode ends and away from the bottom wall.

In any event, if the molten glass body is cooled undesirably, the operating temperature of the heating apparatus can be increased to compensate for any molten glass temperature reduction caused by the chilling of any wall for the purpose of increasing refractory resistivity.

The cooling of the refractory lining is effective to reduce the short-circuit heating of the refractory to a level at which the refractory does not melt nor slough off into the molten glass body, but it may not prevent all short-circuiting through the refractory. However, the small amount of short-circuiting which does occur merely imparts a minor degree of heat to the refractory, and neither the refractory life nor the heating efficiency of the apparatus is materially affected.

Further, the tendency to short-circuit through the refractory is directly, apparently linearly related to the distance through which the current must flow. The primary heating path is from one electrode tip to the opposing electrode tip of opposite polarity while the short-circuit path is peripheral to the pool of molten glass and through the refractory. Where the refractory path is from one electrode through an end wall to the other electrode or from one electrode through the bottom wall to the opposing electrode, the path for short-circuiting is always materially greater than the primary electrode-to-electrode heating path through the molten glass. As a result, it is not necessary to reduce the temperature of the refractory to the extent theoretically necessary to prevent any short-circuiting.

Thus, the refractory need not be cooled to such an extent that its electrical resistivity is increased to the numerical value of the electrical resistivity of the glass. It is only necessary to cool the refractory to an extent such that its electrical resistivity is increased sufficiently to prevent substantial short-circuiting through the refractory path as compared to the electrode-to-electrode current path.

AS SHOWN IN THE DRAWINGS

DESCRIPTION OF THE PREFERRED EMBODIMENT OF THE PRESENT INVENTION

Figure 1:
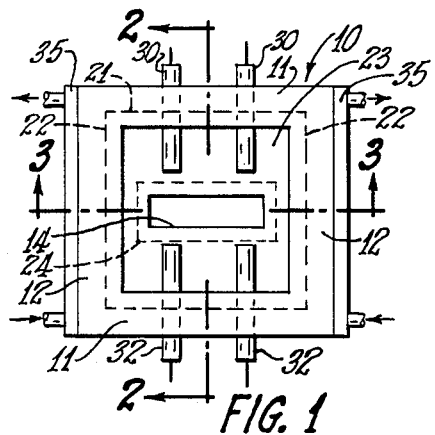
FIG. 1 is a schematic plan view of a glass melting furnace of the present invention capable of carrying out the method of the present invention.
Figure 2:
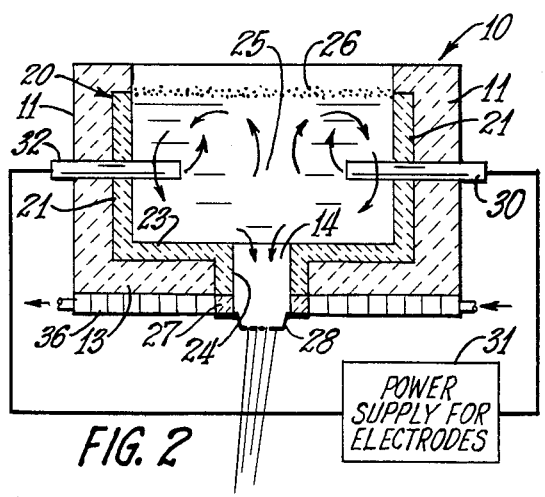
FIG. 2 is a vertical sectional view taken along the plane 2—2 of FIG. 1.
Figure 3:
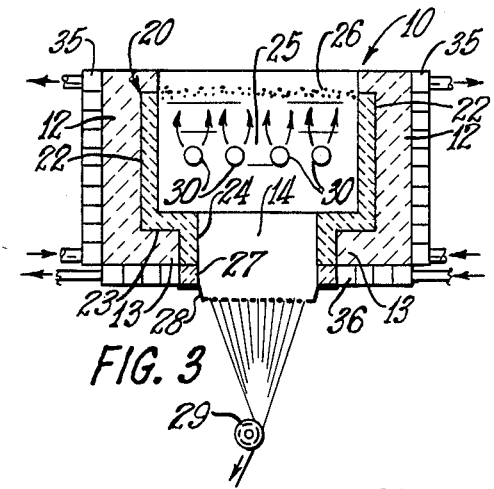
FIG. 3 is a vertical sectional view taken along the plane 3—3 of FIG. 1.

As illustrated in FIGS. 1 through 3 of the drawings, the present invention is incorporated into a melting furnace 10 of the type illustrated and described in detail in the pending United States patent application of Charles S. Dunn et al, Ser. No. 405,851, filed Aug. 6, 1982 and assigned to the assignee of the present invention.

More specifically, the furnace 10 comprises peripheral refractory side walls 11, end walls 12 and a bottom wall 13 formed of suitable refractory material and retained in position by appropriate supporting metal framework and foundations (not shown). The bottom wall is provided with a generally rectangular outlet opening 14. Preferably, the lining 11 is a conventional refractory identified in the art as a sintered zircon refractory having substantially the following composition:

| Ingredient | % by Weight |
|---|---|
| $ZrO_2$ | 65.5 |
| $Al_2O_3$ | 0.5 |
| $Fe_2O_3$ | 0.1 |
| $TiO_2$ | 0.3 |

The refractory side walls 11, end walls 12 and bottom wall 13, including the bottom wall opening 14 are lined with an erosion-resistant, but low-resistivity refractory, preferably a dense chromic oxide refractory, indicated generally at 20 and including side wall portions 21, end wall portions 22, bottom wall portions 23 and an opening lining portion 24 which, in cooperation, form a complete lining for an interior space 25 for containing a body of molten glass. It will be noted that the side wall lining 21 and the end wall lining 22 extend vertically throughout the extent of the molten glass pool space 25 but terminate short of the upper ends of the side walls 11 and end walls 12. The pool of molten glass in the space 25 is surmounted by a blanket of unmelted, particulate glass batch 26.

The side walls 11 and the side wall lining 21 are pierced by heating electrodes 30 which are connected to a power supply as indicated schematically in FIG. 2. The electrodes 30 piercing each side wall 11 and lining 21 are of the same relative polarity while the electrode 32 piercing the opposite side wall 11 and lining 21 are of relatively reversed polarity. The power supplied from the power supply 31 supplies heating current to the electrodes 30 and 32 to heat the body of molten glass in the space 25 in the manner which is described in detail in the above-identified application of Dunn et al, and in the copending application of Eugene C. Varrasso, Ser. No. 342,869, filed Jan. 26, 1982, now U.S. Pat. No. 4,435,811, issued Mar. 6,1984, assignee of the present invention.

As illustrated in FIGS. 1 and 2 of the drawings, an outlet opening 14 circumscribed by the refractory portions 14 and 24 is provided in the bottom of the furnace, and this opening 14 communicates through a bushing block 27 with a lower forming apparatus 28, illustrated in the form of a bushing for forming filaments of fiberglass, which filaments are drawn downwardly about a collection roller 29 to a conventional winder (not shown).

As explained in the above-identified Dunn et al application, the heating of the molten glass in the space 25 occurs primarily between the inboard ends of the electrodes 30 and 32, and heated molten glass between the electrodes rises vertically within the space 25 upwardly into contact with the undersurface of the batch blanket 26 due to the convection currents generated by the hottest glass between the electrode ends. The rising hot molten glass then flows outwardly along the undersurface of the batch blanket 26 and then downwardly along the outer wall linings 21, 22 back to the location of the electrodes 30, 32.

Some of the downwardly flowing glass flows past the electrode location downwardly toward and through the outlet opening 14 and the bushing block 27 into the forming apparatus 28. Due to the rising convection currents generated between the electrodes 30 and 32, the hottest glass of the molten glass pool within the space 25 is located generally above the location of the electrodes 30 and 32, and this glass is circulated and recirculated by convection from the electrodes 30 and 32 to melt the batch blanket 26. A minor amount of the thermally recirculated glass equal to the throughput of the bushing 28 flows downwardly past the electrodes. This quantity of glass is cooled in successive isothermal planes to the desired temperature for introduction into the bushing. Thus, the glass beneath the electrodes 30 and 32 is generally cooler than the glass above the electrodes 30 and 32, and this cooler glass flows through the substantially isothermal planes downwardly through the outlet opening 14 and the bushing block 27 into the bushing 28.

The present invention, while applicable to any glass composition, is particularly applicable to low flux content glasses, such as fiberglass compositions of relatively high melting point. Where the glass composition being melted is E glass, the hottest glass, i.e., that glass above the electrodes 30, is generally at a temperature on the order of 2700° F. to 2800° F. (1482° C. to 1538° C.) while the glass entering the bushing 28 is substantially cooler, generally at a temperature on the order of 2300° F. to 2450° F. (1260° C. to 1343° C.). A typical "E" glass composition is as follows:

| Ingredient | % by Weight |
| --- | --- |
| $SiO_2$ | 54.5 |
| $Al_2O_3$ | 14.5 |
| $Fe_2O_3$ | 0.4 |
| $CaO$ | 17.5 |
| $MgO$ | 4.4 |
| $Na_2O$ | 0.5 |
| $B_2O_3$ | 6.5 |
| $F_2$ | 0.3 |

Glasses other than E glass can be suitably utilized in the present invention. For example, C glass can be formed into fibers in the bushing 28. A typical C glass composition has the following composition:

| Ingredient | % by Weight |
| --- | --- |
| $SiO_2$ | 65.1 |
| $Al_2O_3$ | 3.7 |
| $Fe_2O_3$ | 0.4 |
| $CaO$ | 14.3 |
| $MgO$ | 2.8 |
| $Na_2O$ | 8.1 |
| $B_2O_3$ | 5.5 |

The refractory lining for the molten glass space 25 must be compatible with the glass being melted, i.e., the refractory must be inert to the glass composition at the operating temperature of the heating apparatus, and it must resist erosion by the glass particularly at the regions above the electrodes where the molten glass is rapidly circulated by the thermal convection currents generated by the heat imparted to the molten glass between the electrode tips.

It has been found that a dense chromic oxide refractory, such as that manufactured by Corhart Refractories of Louisville, KY under the tradename "C-1215 Chromic Oxide Refractory" is compatible with E glass. This refractory has the composition:

| Ingredient | % by Weight |
| --- | --- |
| $TiO_2$ | 3.8 |
| $Cr_2O_3$ | 92.7 |
| $Fe_2O_3$ | 0.4 |
| Impurities | 3.1 |

The above refractory can also be used with C glass of the above composition. Also compatible with C glass, but not with E glass, is a refractory sold by The Carborundum Company of Falconer, N.Y., under the tradename "Monofrax E". This refractory has the composition:

| Ingredient | % by Weight |
| --- | --- |
| $Cr_2O_3$ | 79.7 |
| $MgO$ | 8.1 |
| $Fe_2O_3$ | 6.1 |
| $Al_2O_3$ | 4.7 |
| $SiO_2$ | 1.3 |
| Total Alkali | 0.1 |

As above explained, the above-defined refractories and other similar refractories are utilized as the heating apparatus linings 21, 22, 23 and 24 because of their compatibility with the desired glass compositions and their high erosion resistance to the molten glass circulating within the space 25 and flowing through the outlet 14 and the bushing block 27 into the bushing 28, particularly at the elevated temperatures at which the glass is melted and conditioned within the furnace 10. However, the electrical resistivity of the refractories of the linings at the operating temperatures of the furnace 10 is less than the electrical resistivity of the molten glass body in the space 25 and flowing through the furnace 10 into the bushing 28.

Figures 7, 8:
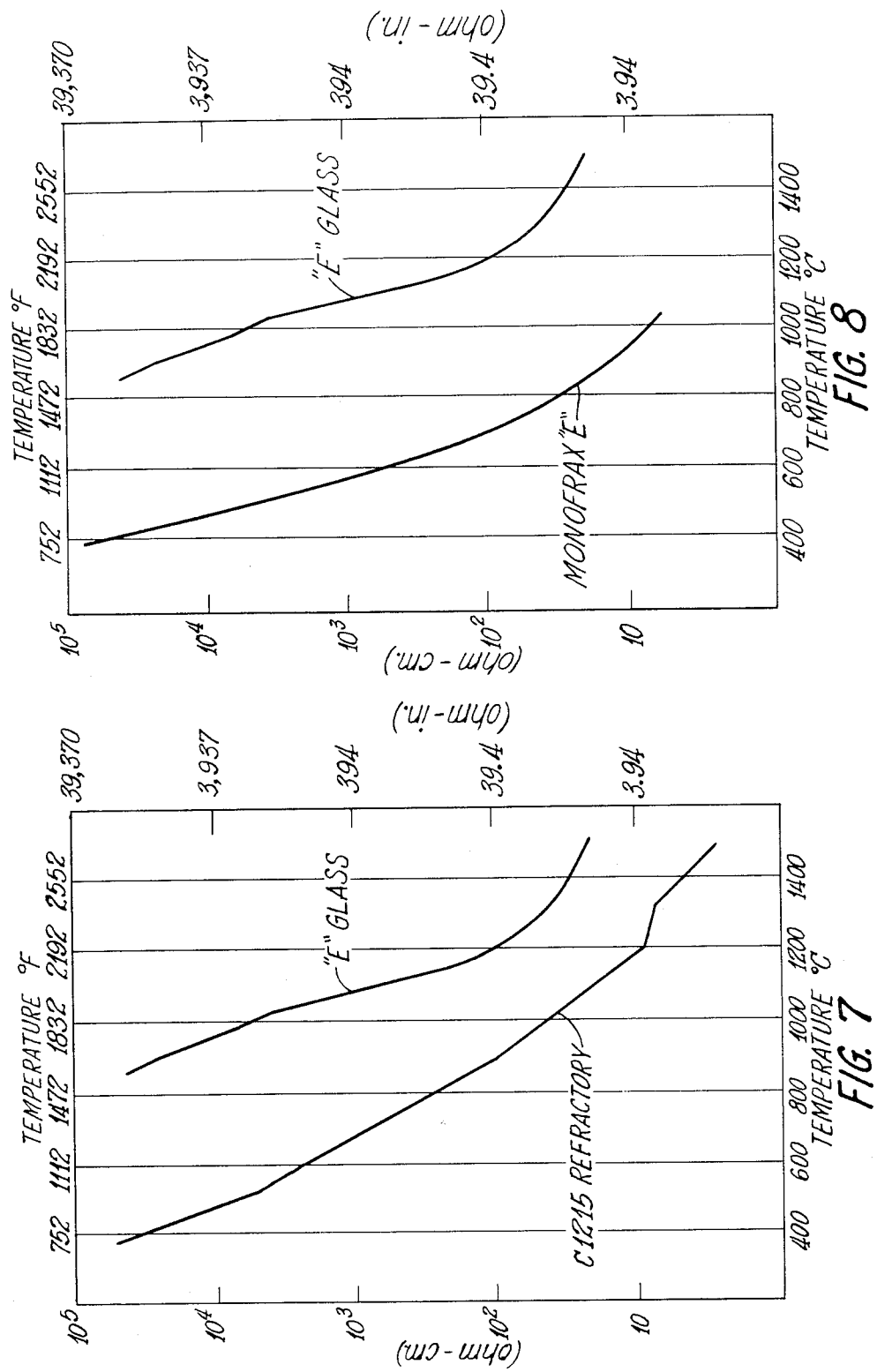
FIG. 7 is a graphic representation of the relative electrical resistivity of a chromic oxide refractory and molten E glass at varying temperatures.
FIG. 8 is a graphic representation similar to FIG. 7 showing the relative electrical resistivity of a different chromic oxide refractory and molten E glass.

As illustrated in FIGS. 7 and 8 of the drawings, these differences in electrical resistivity may be readily ascertained. In FIG. 7, the electrical resistivity of the high density chromic oxide refractory C-1215 is plotted vertically against the temperature in both degrees Centigrade and degrees Fahrenheit which is plotted horizontally. Additionally, the electrical resistivity of E glass is plotted in FIG. 7. It will be seen from the chart of FIG. 7 that E glass has an electrical resistivity of about 12 ohm-centimeter at 2700° F. (1482° C.) while the refractory at the same temperature has an electrical resistivity of only about 2 ohm-centimeter. The refractory has an electrical resistivity of about 12 ohm-centimeter at a temperature of 2012° F. (1100° C.). Similarly, the Monofrax E refractory has an electrical resistivity which is less than that of E glass at the furnace operating temperature, as shown in FIG. 8.

Since the electrical resistivity of the refractory lining portions 21–24 is less than the electrical resistivity of the molten glass in the space 25, the electrodes 30 and 32 will short-circuit through the lower resistivity refractory in preference to flowing through the molten glass of higher resistivity, and the current from the power supply 31 will heat the refractory rather than the molten glass. As a result, the refractory will be heated and, if not melted, will slough off into the molten glass within the space 25 forming stones or other solid discontinuities in the molten glass.

The electrode current will not short-circuit through side walls 11 and the refractory 21 of the side walls since there is no appreciable flow of electricity between the electrodes of the same polarity carried by the side walls.

To prevent short-circuiting through the refractory lining 22 of the end walls 12 and the refractory lining 23 of the bottom wall 13, the lining 24 of the opening 14 and the lower bushing block 27, these areas preferably are water-cooled to a temperature at which the electrical resistivity of the refractory is increased appreciably. This is accomplished by means of heat exchangers 35 mounted on the exterior of the end walls 12 and heat exchangers 36 mounted on the exterior bottom surface of the bottom wall 13. These heat exchangers are of any conventional design and preferably are of the type which provide labyrinthian passages through which cooling water is flowed as indicated by the appropriate directional arrows of FIGS. 1, 2 and 3. By so cooling the side walls 12 and the bottom wall 13, the chromium oxide refractory lining is cooled to an extent such that the electrical resistivity of the lining is appreciably increased and short-circuiting through the lining is minimized.

As will be clear from the glass circulation diagram of FIGS. 2 and 3 and the above disclosure, the hottest glass and the most rapidly circulating glass are located above the plane of the electrodes 30 and 32. Thus, the most severe erosion and short-circuiting problems exist in the upper regions of the furnace 10, while the molten glass flows in cooler, essentially isothermal zones of relatively quiescent character along the furnace bottom 23 and through the outlet opening 14 and the bushing block 27. Accordingly, it is possible to line these areas with a compatible zircon refractory or similar high resistivity, non-water cooled refractory, if desired.

Figure 4:
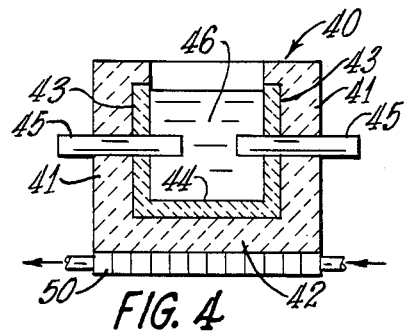
FIG. 4 is a vertical sectional view similar to FIG. 2 showing the invention as embodied in a forehearth channel.

In that version of the invention illustrated in FIG. 4 of the drawings, the same principles as described in connection with FIGS. 1 through 3 are applied to a forehearth 40 which is simply a glass channel interconnecting a melting apparatus and a forming apparatus and through which molten glass flows. In FIG. 4, the forehearth side walls 41 and bottom wall 42 are formed of a suitable refractory, preferably a zircon refractory, as described in connection with FIGS. 1 through 3 and the side walls 41 and the bottom wall 42 are lined with a lining 43 and 44, respectively, formed of an erosion-resistant refractory of low electrical resistivity, also as described in connection with FIGS. 1–3, preferably a chromic oxide refractory such as those earlier herein disclosed. The side walls 41 and 43 are pierced by opposing electrically energizable electrodes 45 by means of which the molten glass body 46 flowing through the forehearth is heated to compensate for any heat losses therein.

In accordance with the principles of this invention and in order to prevent short-circuiting through the bottom wall refractory lining 44, a heat exchanger 50 is provided in full surface contact with the undersurface of the bottom wall 42, this heat exchanger being of the same type as those earlier disclosed in connection with FIGS. 1–3. The heat exchanger 50 cools the bottom wall 42 and the bottom wall lining 44 to an extent such that the electrical resistivity of the lining 44 is substantially increased and the tendency for short-circuiting between the electrodes 45 by electrical flow through the lining 44 is reduced.

Figure 5:
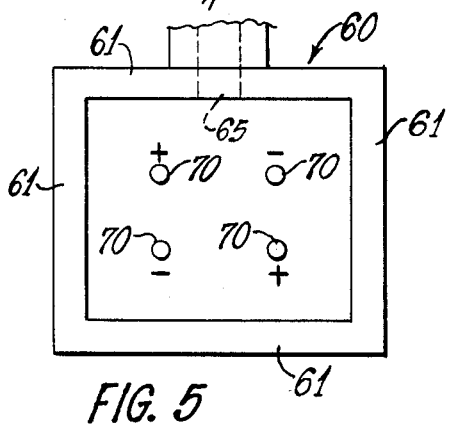
FIG. 5 is a plan view similar to FIG. 1 but illustrating the invention as embodied in a melting furnace having bottom entering electrodes.
Figure 6:
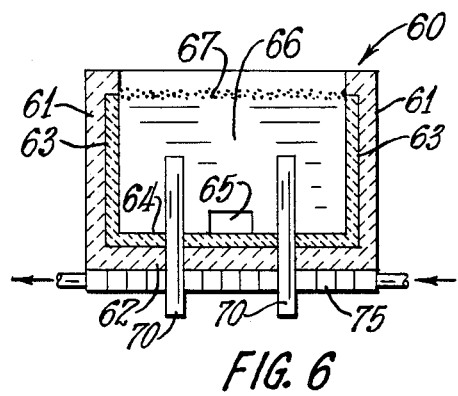
FIG. 6 is a vertical sectional view of that version of the invention illustrated in FIG. 5 of the drawings.

In that embodiment of the invention illustrated FIGS. 5 and 6, the principles of the present invention are embodied into a glass melting furnace having bottom entering electrodes. More specifically, the furnace 60 comprises refractory side walls 61 and a refractory bottom wall 62, each of the side walls 61 and the bottom wall 62 being provided with an erosion-resistant lining 63 and 64, preferably of a chromic oxide refractory material as hereinbefore disclosed. One of the side walls 61 and its lining 63 is provided with an exit port 65 through which molten glass flows from the pool of molten glass 66 confined by the side wall linings 63 and the bottom wall lining 64. This pool of molten glass 66 is surmounted by a layer of particulate, unmelted glass batch 67.

Four electrodes 70 project upwardly through the bottom wall 62 through the bottom wall lining 64 into the molten glass pool 66, and these electrodes are energized by a power supply (not shown) effective to energize the electrodes with melting current of opposing polarity. The number of electrodes and their geometric arrangement, as illustrated in FIGS. 5 and 6, is schematic and is intended merely as representative of any of the numerous well known, commercially available bottom entry glass heating electrode arrangements. Suitable electrode arrangements and suitable power supplies for such electrodes are well known in the art and are disclosed, for example, in the U.S. patents to Gell, No. 3,683,093; Orton, No. 3,395,237; and Holler et al, No. 3,836,689, among others.

Since the electrodes 70 are of opposite polarity and are carried by the common bottom wall 62 and 64 of the furnace 60, short-circuiting through the low resistivity bottom wall lining 64 is prevented by cooling the bottom wall 62 by means of a heat exchanger 75 in full face-to-face contact with the undersurface of the bottom wall 62 and receiving cooling water for circulation therethrough in the manner hereinbefore described. By cooling the bottom wall 62 and the lining 64 for the bottom wall, the resistivity of the bottom wall is increased to an extent such that substantial short-circuiting through the bottom wall 64 does not occur for the reasons and in the manner heretofore described.

In the furnace of the type illustrated in FIGS. 5 and 6, the coolest glass in the furnace is that adjacent the bottom wall 62 and 64, since the heated glass from the electrodes 70 rises in the furnace and flows by convection away from the bottom wall. Further, glass supplied to the forming apparatus (not shown) through the aperture 65 is at a temperature which is substantially less than the temperature of the glass at the upper ends of the electrodes 70. Since the electrical resistivity of both the molten glass of the pool 66 and of the bottom wall lining 64 varies inversely and exponentially with temperature, it will be seen that the glass at the primary flow path between the electrodes is at a substantially higher temperature than the temperature of the lining 64. This temperature differential may range from about 300° F. to about 500° F. If the heat exchanger 75 then cools the lining 64 to a greater extent, then this temperature differential increases even further and the relative resistivity of the lining 64 is increased to an extent such that short-circuiting through the lining 64 will be minimized.

I claim:

1. A method of heating molten glass, comprising:
   a. providing a body of molten glass in a heating apparatus having glass-confining side and bottom walls provided with a refractory lining, the refractory lining having an electrical resistivity that decreases with an increase in its temperature and that, at the temperature of the molten glass, is less than the electrical resistivity of the molten glass;
   b. electrically heating the body of molten glass by heating electrodes of opposite polarity immersed in the molten glass; and
   c. cooling the refractory lining of these walls interposed between electrodes of opposite polarity to substantially increase the electrical resistivity of said lining.

2. The method of claim 1 wherein the electrodes extend through opposing side walls of the heating apparatus, the electrodes of each of the respective side walls are all of the same polarity and the electrodes of the opposing wall are of opposite polarity, the opposing side walls are joined by spaced end walls, and the end walls are cooled.

3. The method of claim 1, wherein all of the electrodes extend through a single wall of the apparatus, and said single wall is cooled.

4. The method of claim 1, wherein the heating apparatus is a forehearth for conveying molten glass to a forming location, the electrodes extend through opposing side walls of the forehearth, the electrodes of the respective side walls are all of the same polarity and the electrodes of opposing walls are of opposite polarity, and the forehearth bottom wall is cooled.

5. An electrically energized glass melting furnace comprising:
   a. a furnace having side and end walls provided with molten glass contacting surfaces formed of a chromic oxide refractory;
   b. a plurality of electrically energizable electrodes carried by the side walls and projecting into the body of molten glass, the electrodes carried by each side wall all being of the same polarity; and
   c. a receptacle for molten glass having its walls lined with a heat exchange means in heat exchange relation to the end walls and effective to cool the chromic oxide refractory to a temperature at which its resistivity is materially increased and short-circuiting through the refractory is substantially eliminated.

6. An electrically energized glass heating apparatus comprising:
   a. a receptacle gor molten glass having its walls lined with a refractory material which has an electrical resistivity that varies inversely with the temperature of the refractory and that, at the temperature of molten glass, has an electrical resistivity less than the electrical resistivity of the molten glass;
   b. a plurality of electrically energizable electrodes of different polarity extending through at least one wall of said receptacle to be immersed in the body of molten glass; and
   c. means for cooling the refractory material of those walls interposed between electrodes of differing polarity to reduce the temperature of the interposed refractory material to a temperature at which the electrical resistivity of the interposed refractory material is substantially increased.

7. An apparatus as defined in claim 6, wherein the apparatus is a glass melting furnace, the receptacle has side, end and bottom walls lined with said refractory, the electrodes extend through the side walls with the electrodes of such side wall being of the same polarity and the electrodes of opposing side walls are of different polarity, and the end and bottom walls are provided with the cooling means.

8. An apparatus as defined in claim 6 wherein the electrodes of different polarity extend through the bottom wall only of the receptacle, and the bottom wall is provided with the cooling means.

9. An apparatus as defined in claim 6 wherein the receptacle is a forehearth, the electrodes extend through the forehearth side walls, and the bottom wall is provided with the cooling means.

10. In a method of heating glass in a glass heating apparatus having a refractory lining which, at the apparatus operating temperature, has an electrical resistivity less than the resistivity of the glass being heated, the steps of:
    a. electrically heating the molten glass by electrodes inserted through the refractory lining of opposing walls of the apparatus, the electrodes of a given wall being of the same polarity and the electrodes of opposing walls being of different polarity; and
    b. maintaining the non-electrode bearing walls of the apparatus at a temperature less than the temperature of the molten glass and at which the resistivity of the refractory lining of the non-electrode bearing walls is substantially increased.

11. In a method of heating glass, the steps of:
    a. maintaining a body of molten glass in contact with opposing refractory walls pierced by heating electrodes and joined by a joining refractory wall having no electrodes, the electrodes of the opposing walls being of different polarity, the refractory of said walls having an electrical resistivity which is less than the resistivity of the glass at the temperature of the molten glass; and b. cooling the joining wall to a temperature (a) that is less than the temperature of the molten glass and (b) that materially increases the resistivity of the joining wall to a value at which appreciable short-circuiting through said joining wall does not occur.

12. In an apparatus for heating a body of molten glass, a heating space defined by side, end and bottom peripheral walls; heating electrodes of the same polarity carried by each of the side walls and projecting into said space, the electrodes of opposing walls being of opposite polarity; a refractory lining for said peripheral walls, the lining having an electrical resistivity (a) that varies inversely with the lining temperature and (b) that, at the operating temperature of the apparatus, is less than the resistivity of molten glass; and heat exchange means in heat exchange relation with the end and bottom peripheral walls for cooling the lining of said end and bottom walls.

13. The method of reducing short-circuiting in an electrically energized glass heating apparatus having spaced electrodes of opposite polarity and a refractory lining of relatively low electrical resistivity through which the electrodes extend comprising the step of cooling those portions of the refractory lining which are interposed between electrodes of opposite polarity to an extent sufficient to materially increase the electrical resistivity of said lining portions.

14. In a method of operating an electrically heated glass heating furnace having a heating space circumscribed by refractory walls less than all of which bear heating electrodes of opposite polarity, the improvement of cooling the non-electrode bearing refractory walls of said furnace to an extent sufficient (a) to materially increase the electrical resistivity of the cooled walls and (b) to reduce short-circuiting therethrough.

15. The method of heating glass comprising the steps of:

a. confining a pool of molten glass in contact with side, end and bottom walls of a chromic oxide refractory;

b. heating the pool by electrodes projecting through the side walls into said pool, the electrodes of each side wall being of the same polarity and the electrodes of the opposing side walls being of opposite polarity;

c. cooling the chromic oxide refractory of said end walls and said bottom wall only to a temperature at which the electrical resistivity of said chromic refractory is materially increased.

* * * * *